March 20, 1962     R. JOHNSON     3,025,884
DUCT OUTLET WITH ADJUSTMENT FOR FLOOR LEVEL
Filed April 17, 1956
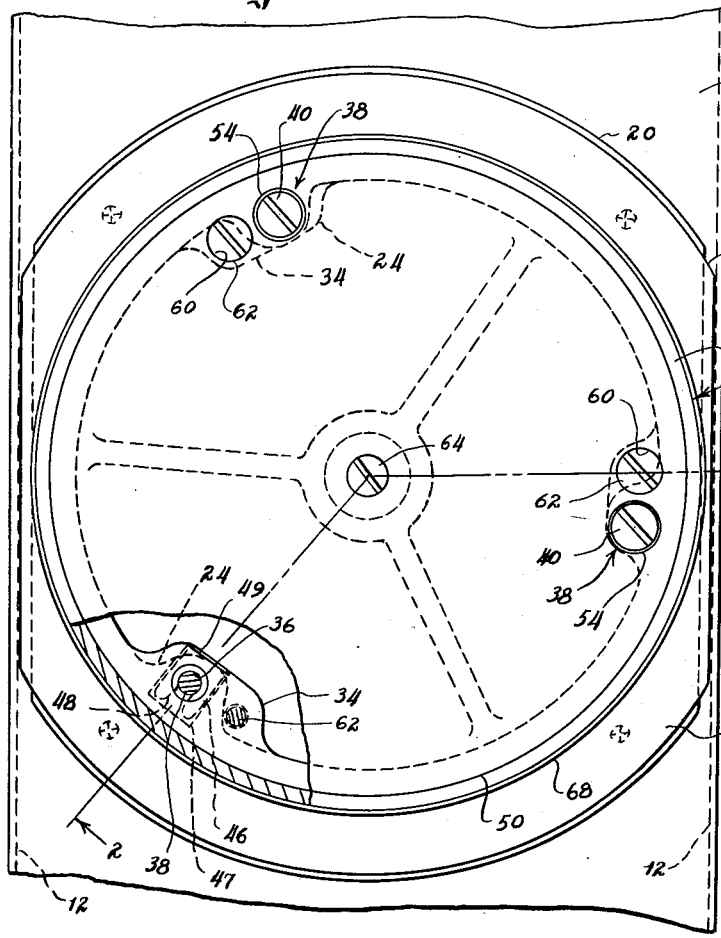
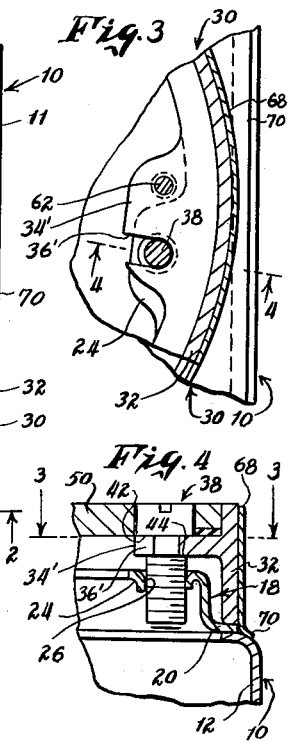
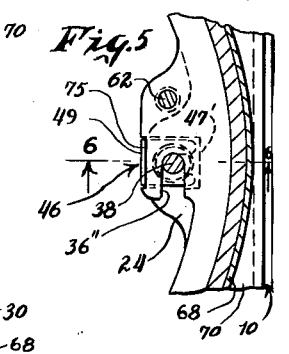
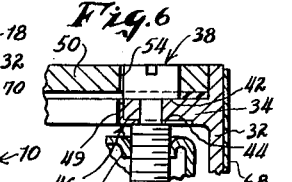
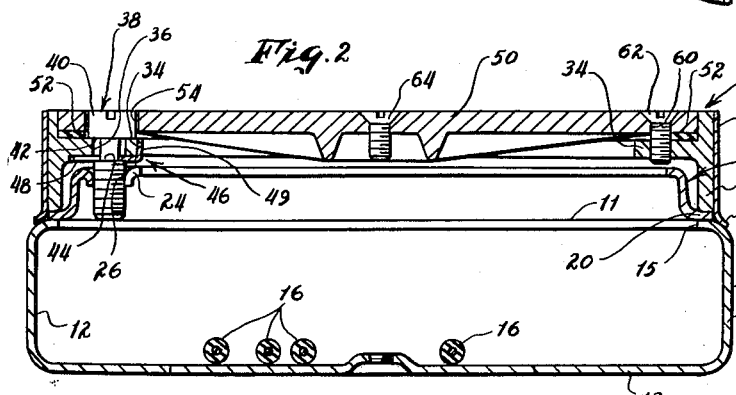
INVENTOR.
Robert Johnson
BY Emery, Whittemore,
Dundore & Day
ATTORNEYS United States Patent Office 3,025,884
Patented Mar. 20, 1962

3,025,884
DUCT OUTLET WITH ADJUSTMENT FOR
FLOOR LEVEL
Robert Johnson, Edgeworth, Pa., assignor, by mesne assignments, to H. K. Porter Company Inc., Pittsburgh, Pa., a corporation of Delaware
Filed Apr. 17, 1956, Ser. No. 578,617
14 Claims. (Cl. 138—92)

This invention relates to outlets for underfloor ducts which carry electric wiring.

Such ducts have top walls with openings therein at spaced locations along the duct and it is common practice to provide outlet fittings over these openings for extending the opening to the level of the floor at locations where wires are to be led out of the duct, or at locations where it may be desirable in the future to lead wires from the duct. At locations where the outlet is not to be used immediately, a cover is provided and it is important to have the cover flush with the top surface of the floor so that continuous floor coverings can be used over the duct outlet.

Outlet fittings of the character indicated, have been provided with levelling screws by which the top of the fitting can be made flush with the screed line of a poured concrete floor, or with the level of any kind of floor in which the outlet fitting is located.

It is an object of this invention to provide a combination of an outlet fitting and a duct with improved features which permit the fitting to be adjusted with less labor and with the cover in place so that the duct is protected against having trash or other foreign matter fall through the opening during the time when it is being adjusted. Another object is to seal any clearance which would otherwise open up between an outlet fitting and its duct as the result of upward adjustment of the fitting with respect to the duct.

Another object of the invention is to provide an improved outlet fitting for underfloor wiring ducts and in which the same levelling screws are used for both raising and lowering the outlet fitting to bring it flush with the level of a floor. The invention provides thrust bearings which prevent axial movement of the leveling screws with respect to the outlet fitting, and another feature of the invention extends the upper ends of the screws through the cover of the fitting to a level flush with the top surface of the cover. This is practical because of the thrust bearings which maintain the levelling screws at a constant level with respect to the outlet fitting and its cover.

Other objects, features and advantages of the invention will appear or be pointed out as the description proceeds.

In the drawing, forming a part hereof, in which like reference characters indicate corresponding parts in all the views;

FIGURE 1 is a top plan view, partly broken away and in section, showing an outlet fitting and underfloor duct made in accordance with this invention;

FIGURE 2 is a sectional view taken on the line 2—2 of FIGURE 1;

FIGURE 3 is a fragmentary view, similar to the sectional portion of FIGURE 1, but showing a modified form of the invention;

FIGURE 4 is a sectional view taken on the line 4—4 of FIGURE 3;

FIGURE 5 is a view similar to FIGURE 3, but showing a second modified form of the invention; and FIGURE 6 is a sectional view taken on the line 6—6 of FIGURE 5.

FIGURES 1 and 2 show an underfloor duct 10 having a top wall 11, side walls 12 and a bottom 13. In the top wall 11 there is an opening 15. In order to provide more convenient access to wiring 16, within the duct, the opening 15 is of large diameter and it extends across almost the entire width of the top wall 11. It will be understood that there are similar openings 15 at spaced locations along the length of the duct 10.

An outlet ring 18 surrounds the opening 15 and extends upwardly from the top wall 11. This outlet ring 18 has a flange 20 in contact with the top wall 11 over an area of substantial radial extent. The flange 20 is cut off along the sides 12 so as to prevent it from extending beyond the duct 10, but this reduced radial width of the flange 20 near the sides of the duct is not objectionable because less area of contact between the flange and the top wall is required for sealing near the locations where the top wall joins the side walls 12 and is stiffened by its juncture with the side walls. The ring 18 is preferably made of metal of a gauge light enough for drawing and the ring is made by a drawing operation and has a taper or converging of its side walls toward the upper end of the ring.

There are inwardly extending projections 24 at the upper end of the ring 18. These projections are preferably of one-piece construction with the remainder of the ring and they are preferably located at 120° intervals around the ring 18. There is a threaded hole 26 extending through each of the projections 24. In the construction illustrated, these holes 26 are extruded so that they have inside surfaces longer than the thickness of the metal from which the ring 18 is constructed. This provides more threads with resulting greater strength.

The construction thus far described is similar to that disclosed in Kennedy patent application, Serial No. 315,945 (now Patent No. 2,763,294, granted Sept. 18, 1956), except that there is only one threaded opening through each of the projections 24, instead of two as shown in the Kennedy application.

An outlet fitting 30 includes a side wall 32 which surrounds the ring 18. At a level intermediate the upper and lower ends of the side wall 32, there is a flange 34 extending inwardly across the upper end of the ring 18. In the construction illustrated this flange 34 is continuous around its circumferential extent, but it has inward extensions where it is of greater radial width. However, the flange 34 can be discontinuous, it being sufficient that it extends inwardly at locations above the projections 24 of the ring 18. For a generic designation of the structure, the flange 34 will be referred to herein, and in the claims, as the "flange means" 34.

There are openings 36 at angularly spaced locations around the flange means 34, and there is a screw 38 extending through each of these openings 36. These screws 38 thread into the holes 26 in the ring projections 24. Each of the screws 38 has thrust bearings for preventing axial movement of the screw with respect to the flange means 34. These thrust bearings may be of various constructions, different forms being shown in different figures of the drawing.

In the construction shown in FIGURES 1 and 2, each screw 38 has a head 40 with a shoulder 42 thereunder, and this shoulder is of larger diameter than the opening 36 and thus provides a thrust bearing, against the top surface of the flange means 34, for preventing downward axial movement of the screw 38 with respect to the flange means 34. There is a second shoulder 44 on the screw 38 at the upper end of the threads. This shoulder may be the top thread but is preferably a separate shoulder having an annular face in a plane normal to the longitudinal axis of the screw 38. In order to permit the screw 38 to be inserted through the opening 36, during assembly of the outlet fitting, the shoulder 44 is of less diameter than the opening 36, and a retainer or clip 46 is placed on the screw, above the second shoulder 44, and immediately below the flange means 34, to complete the thrust bearing which prevents upward axial movement of the screw 38 with respect to the flange means 34. There is preferably a recess 47 in the under side of the flange means 34 for receiving the clip 46 and holding it in position.

The clip 46 is preferably a piece of spring metal having a slot 48 (FIGURE 1) which is of substantially the same diameter as the section of the screw 38 between the shoulders of the screw. The slot 48 is of slightly reduced width toward its open end so that the material of the clip has to bend to admit the screw 38. This holds the clip on the screw and makes it unnecessary to have any other fastening means. The recess 47 is somewhat wider than the clip to permit the clip to spread slightly to admit the screw 38 into slot 48.

At its inner end, the clip 46 has an upwardly extending leg 49 which contacts with a recessed face of the flange means 34. The leg 49 insures against the projection of any sharp edges into the outlet opening surrounded by the flange means 34, and this prevents possible damage to insulation of wires being pulled into or out of the duct through the fitting 30.

A cover 50 is supported by the top of the flange means 34 and preferably has its top surface flush with the upper end of the side wall 32. There is a gasket 52 between the cover 50 and the top of the flange means 34. There are openings 54 in the cover 50 for receiving the heads 40 of the levelling screws 38. The heads 40 fit the openings 54 with running clearance and the top surfaces of the screw heads 40 are flush with the top surface of the cover 50. There are other openings 60 countersunk at their upper ends for receiving screws 62 which secure the cover 50 to the flange means 34. Another screw 64 marks the center of the cover 50 but is not pertinent to the novelty of this invention.

From the construction thus far described, it will be apparent that rotation of the screws 38 will raise or lower the outlet fitting 30 with respect to the ring 18. In FIGURE 2, the outlet fitting 30 is shown at the lower limit of its range of movement. When used with poured concrete floors, the screws 38 are rotated to bring the top of the fitting 30 exactly flush with the screed line of the floor. This adjustment may necessitate the trimming away of some concrete which overlaps the top of the fitting, and it is an advantage of the invention that the adjustment is made without removing the cover 50. This eliminates the danger of having pieces of chipped concrete or other foreign material fall into the duct through the fitting.

In order to reduce the amount of adjustment necessary after the floor is poured, the fitting 30 is initially adjusted to a level almost equal to the screed line of the floor. With some floors this will leave a substantial clearance between the lower end of the side wall 32, of the outlet fitting 30, and the flange 20 of the duct ring 18. In order to prevent moisture and fluid concrete from entering through this clearance, a sleeve 68 is provided around the outside of the side wall 32 of the outlet fitting 30. This sleeve 68 is preferably made of thin sheet metal, or fibre, and it has a sliding fit on the outlet fitting 30, so that fitting 30 and the sleeve 68 are in telescoping relation with one another. The sleeve 68 is held against movement with respect to the duct 10. In the construction shown, there is a flange 70 at the lower end of the sleeve 68, for preventing upward movement of the sleeve. This flange 70 covers or substantially covers the flange 20 and can be connected to the flange 20 by adhesive or in any other suitable way for preventing friction of the sleeve 68 on the fitting 30 from moving the sleeve upwardly when the outlet fitting 30 is adjusted upwardly. With concrete floors the concrete poured over the flange 70 holds the sleeve 68 down. The sleeve 68 is long enough to overlap a portion of the outlet fitting 30 within the full range of vertical adjustment of the outlet fitting.

FIGURES 3 and 4 show a modified construction of the invention. The structure in FIGURES 3 and 4, which is identical with that shown in FIGURES 1 and 2, is indicated by the same reference characters; and corresponding structure, which is modified, is indicated by the same reference characters with a prime appended. Levelling screws 38 extend through slots 36' in the flange means 34' which extend inwardly from the side wall 32 of the outlet fitting 30'. These slotted openings 36' have a width substantially equal to the diameter of the screws 38 between the shoulders 42 and 44. Thus, the shoulders 42 and 44 serve as thrust bearings by direct contact with the surfaces of the flange means 34; but in order to insert the screws 38 into these openings 36', it is necessary to have the slots as the openings so that there is an open end through which the screws 38 can be moved transversely into the openings 36'.

Each of the screws 38 is located in position in its slotted opening 36' before being threaded into the hole 26 in the projection 24 of the duct ring 18. After being threaded into the hole 26, this hole prevents the screw 38 from moving in a direction which would cause it to come out of the open end of the slotted opening 36'.

FIGURES 5 and 6 show another modified construction in which there is a slotted opening 36" of the same width as the slotted opening 36' of FIGURES 3 and 4, but extending circumferentially. This construction requires the use of the clips 46 for holding the screws 38 in the slots 36". Each clip 46 fits into a recess 47' in the under side of the flange means 34 and the leg 49 of the clip extends upwardly into a recess 75 in the inner edge face of the flange means. These recesses 47' and 75 prevent turning of the clip 46 and also prevent movement in a direction which would permit the screw 38 to come out of the slotted opening 36" through the open end of this slotted opening.

The preferred embodiments of the invention have been illustrated and described, but changes and modifications can be made and some features can be used in different combinations without departing from the invention as defined in the claims.

What is claimed is:

1. The combination with an electric wiring underfloor duct that has a top wall with an outlet therein and a ring secured to the duct around the opening and extending upwardly from the top wall, the ring having inwardly extending projections at its upper end and the projections having holes therein with screw threads in the holes, of an outlet fitting having a side wall, the lower portion of which surrounds at least the upper part of the ring in telescoping engagement therewith, flange means extending inwardly from the side wall of the outlet fitting, the flange means having slots therein of less width than the openings through the ring, each of the slots extending to an inner edge of the flange means so that the slot is open at one end, and each of the slots extending over one of the openings through the ring, screws extending through the openings in the flange means and threaded into the holes in the ring projections, the head and threaded portion of each screw having its head and its threaded portion of a diameter larger than the width of the slots, and each screw having a portion of reduced diameter between the head and threaded portion fitting freely through the slot and each screw having shoulders at the upper and lower ends of the reduced diameter portion providing thrust bearings that contact with the flange means to prevent axial movement of the screw with respect to the flange means whereby the outlet fitting is raised or lowered with respect to the ring by rotation of the screws in one direction or the other, and a cover that fits the upper end of the outlet fitting.

2. The combination described in claim 1 and in which the ring has a flange overlying and contacting with the top wall for the full width of the top wall between side walls of the duct, said flange extending over an annular area of substantial radial extent and of greater radial extent at locations inward from the sides of the duct, and in which the projections on the ring have holes at three angularly spaced locations around the ring, and in which the cover extends within the upper end of the outlet fitting and is supported by the flange means and has holes therein into which the heads of the screws extend.

3. The combination described in claim 2 and in which the screws extend through the cover to a level flush with the top of the cover, and the top of the cover is flush with the top of the side wall of the outlet fitting.

4. The combination described in claim 2 and in which the screw holes in the ring projections are extruded to give them an effective length greater than the thickness of the ring and there is a sleeve of sheet material extending around the outside of the side wall of the outlet fitting and downwardly beyond the lower end of the outlet fitting and around the ring for preventing entrance of moisture or fluid concrete into any clearance that opens up between the outlet fitting and the ring as the result of upward adjustment of the outlet fitting with respect to the ring.

5. The combination described in claim 1 and in which there is a sleeve around the outside of the side wall of the outlet fitting and with respect to which the outlet fitting is movable with telescoping relation, the sleeve extending downwardly to the duct and having means for preventing it from moving upwardly when the outlet fitting is adjusted upwardly to bring its top level with the screed line of a concrete floor.

6. An underfloor duct outlet fitting for use with a duct outlet that has an upwardly extending ring with inwardly extending projections at the top of the ring with threaded holes therein, said fitting including a side wall, the lower portion of which is adapted to surround the ring of the duct, flange means extending inwardly from the side wall and having openings therethrough in position to register with the threaded openings in the ring, screws extending through the openings in the flange means for threading into the projections of the ring, thrust bearings on each screw both above and below said flange means for limiting the axial movement of the screw with respect to the flange means so that the outlet fitting is raised or lowered by rotation of the screws one way or the other when threaded into the openings in the ring projections, and a cover at the upper end of the outlet fitting with substantially cylindrical openings therethrough in alinement with each of the screws, said screws having heads which extend upwardly through the openings in the cover to a level substantially flush with the top surface of the cover.

7. The outlet fitting described in claim 6 and in which each of the screws has a head with a shoulder thereunder of larger diameter than the opening in the flange means to provide one thrust bearing, and each of the screws has a second shoulder below the flange means but of smaller diameter than the opening in the flange means through which the screw extends, and a clip on the screw below the flange means and supported by the second shoulder and of larger cross section than the opening in the flange means above it for providing the thrust bearing that prevents upward movement of the screw with respect to the flange means.

8. The outlet fitting described in claim 6 and in which each screw has a head with a shoulder thereunder of larger diameter than the opening in the flange means through which the screw passes for providing one of the thrust bearings of the screw, a second shoulder on the screw at a location immediately below the flange means and also of larger diameter than the opening in the flange means through which the screw extends, the openings in the flange means comprising slots extending to the edge of the flange for permitting entry of the screws into the openings in a direction transverse of the longitudinal axes of the screws.

9. The outlet fitting described in claim 6 and in which each of the screws has a head with a shoulder thereunder for providing one of the thrust bearings of the screw, and a second shoulder on each screw at a location immediately below the flange means, the second shoulder also being of larger diameter than the opening through the flange means to provide a second thrust bearing on the screw, the openings through the flange means being located in inward extensions of the flange means and each opening being a slot which extends substantially circumferentially and to one end of the inward extension in which it is located, and a retainer for preventing circumferential movement of each screw with respect to its slotted opening through the flange means after the screws have been positioned in said openings.

10. The outlet fitting described in claim 6 with a telescoping sleeve surrounding the side wall of the outlet fitting for closing any clearance left below the outlet fitting and between the outlet fitting and the duct when the outlet fitting is adjusted upwardly for levelling it with a floor in which the fitting is located.

11. The outlet fitting described in claim 10 and in which the telescoping sleeve has a flange at its lower end for connection to the duct for preventing upward movement of the sleeve as the level of the outlet fitting is raised.

12. A closure for an opening affording access to wiring in an underfloor duct system of electrical distribution, which comprises a vertical neck element mounted on top of the part of the system having the access opening to surround the opening, the neck having vertically-extending openings inward from its outer surface, a ring element telescoped over and movable lengthwise relative to the neck and having openings aligned with those in the neck, adjustment screws passing through the aligned openings in the neck and ring, said adjustment screws being threaded into the openings in one of said elements, the adjustment screws and the other element having interengaging parts holding the adjustment screws in relatively fixed axial position with respect to said other element while permitting free rotation of the screws with respect thereto, whereby rotation of the adjustment screws will cause vertical movement of said ring relative to the neck, and a closure plate mounted on the ring, said closure plate having openings through which said adjustment screws are accessible.

13. The closure of claim 12, in which the neck has internal ears, through which the threaded openings extend, and the ring has an internal flange, on which the closure plate is seated.

14. The closure of claim 13, in which the ring has inward extensions from its flange, and the openings for the screws are formed in the extensions.

References Cited in the file of this patent

UNITED STATES PATENTS

| | | |
|---|---|---|
| 740,663 | Krantz | Oct. 6, 1903 |
| 1,533,759 | Richardson | Apr. 14, 1925 |
| 1,949,883 | Sharp | Mar. 6, 1934 |
| 2,043,648 | Bissell et al. | June 9, 1936 |
| 2,657,250 | Wiesmann | Oct. 27, 1953 |
| 2,763,294 | Kennedy | Sept. 18, 1956 |